(12) United States Patent
Yamada et al.

(10) Patent No.: US 8,323,005 B2
(45) Date of Patent: Dec. 4, 2012

(54) MOTOR-DRIVEN COMPRESSOR

(75) Inventors: Tetsuya Yamada, Aichi-ken (JP);
Shingo Enami, Aichi-ken (JP); Akio Fujii, Aichi-ken (JP); Junya Yano, Aichi-ken (JP); Ken Suitou, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 199 days.

(21) Appl. No.: 12/877,249

(22) Filed: Sep. 8, 2010

(65) Prior Publication Data

US 2011/0058973 A1 Mar. 10, 2011

(30) Foreign Application Priority Data

Sep. 8, 2009 (JP) ................. P2009-206956

(51) Int. Cl.
*F04B 35/04* (2006.01)
(52) U.S. Cl. ............... 417/410.1; 310/194; 418/55.1
(58) Field of Classification Search ........... 417/410.1; 418/55.1; 310/194
See application file for complete search history.

(56) References Cited

U.S. PATENT DOCUMENTS
2009/0304536 A1* 12/2009 Egawa et al. ............ 417/423.14

FOREIGN PATENT DOCUMENTS
JP 03-264780 A 11/1991
JP 2001-182655 A 7/2001
JP 2005-307798 A 11/2005

* cited by examiner

*Primary Examiner* — Charles Freay
*Assistant Examiner* — Patrick Hamo
(74) *Attorney, Agent, or Firm* — Sughrue Mion, PLLC

(57) ABSTRACT

A motor-driven compressor includes a compression mechanism, an electric motor, a compressor housing, a conductive member, a terminal base, an insulating member, a connection terminal, a wire assembly, a terminal housing, first and second holes formed through the terminal housing and first and second seal members. The conductive member extends from the inside to the outside of the compressor housing and connected electrically to the connection terminal at a terminal connection. The wire assembly has a core wire connecting electrically between the connecting terminal and the electric motor, and an insulator covering the core wire. The terminal housing disposed in the compressor housing covers the terminal connection. The wire assembly has an insulating tube covering the insulator, wherein both ends of the insulating tube are opened for communicating with the inside and the outside of the terminal housing through a clearance formed between the insulating tube and the insulator.

8 Claims, 6 Drawing Sheets

MOTOR-DRIVEN COMPRESSOR

BACKGROUND OF THE INVENTION

The present invention relates to a motor-driven compressor.

A motor-driven compressor generally has a hermetic terminal. Japanese Unexamined Patent Application Publication No. 2005-307798 discloses a hermetic terminal including a terminal base disposed in a hole formed through an airtight compressor housing of the motor-driven compressor, a conductive member (terminal pin) for electrically connecting an electric motor and an inverter, and an insulating member (glass insulator) for fixing the conductive member to the terminal base while maintaining the insulation of the conductive member from the terminal base. In the airtight compressor housing, a cluster block is connected to the conductive member of the hermetic terminal. The cluster block has a housing which covers a terminal connection between the conductive member and the connecting terminal to which the wire from the electric motor is connected.

When the operation of the motor-driven compressor is stopped, refrigerant gas in the compressor housing is cooled and condensed, and such liquid refrigerant may remain in the compressor housing. If the liquid refrigerant enters into the cluster block housing and the conductive member disposed in the compressor housing is immersed in the liquid refrigerant, the conductive member and the compressor housing are electrically conducted with each other through the liquid refrigerant, so that the conductive member is no more electrically insulated from the compressor housing. When the operation of the motor-driven compressor is started in such condition, current supplied to the conductive member may leak to the compressor housing through the liquid refrigerant.

To solve the above problem, Japanese Patent Publication No. 2001-182655 discloses a motor-driven compressor wherein the conductive member and the insulating member disposed in the compressor housing are coated with the insulating resin. Thus, if the conductive member is immersed in the liquid refrigerant, the coating of the insulating resin increases the insulation distance between the conductive member and the compressor housing, so that leak between the conductive member and the compressor housing is prevented successfully.

According to the above Publications No. 2005-307798 and No. 2001-182655, the conductive member is prevented from being immersed in the liquid refrigerant by sealing clearance between the compressor housing and the cluster housing accommodating the conductive member or the insulating resin. This helps to prevent the conductive member, the core wire of the wire assembly and the terminal connection from electrically conducting with the compressor housing through the liquid refrigerant, so that the insulation resistance between the compressor housing and the conductive member, the core wire of the wire assembly and the terminal connection may be improved.

Sealing between the cluster housing or the insulating resin and the compressor housing airtightly closes the cluster housing or insulating resin. If liquid refrigerant is accumulated and remained in the compressor housing, pressure difference is created between the cluster housing or the insulating resin and the compressor housing. In this case, there is a fear that the cluster housing and the insulating resin cannot resist the pressure difference.

Any hole formed through the cluster housing or the insulating resin for communication between the cluster housing or the insulating resin and the compressor housing may equalize the pressure between the cluster housing or the insulating resin and the compressor housing. However, current supplied to the conductive member is leaked to the compressor housing from the hole through the liquid refrigerant flowed into the cluster housing or insulating resin, and there is a fear that the conductive member, the core wire of the wire assembly and the terminal connection fail to be insulated from the compressor housing.

The present invention is directed to providing a motor-driven compressor that improves insulation resistance between the compressor housing and the conductive member in the cluster housing, the core wire of the wire assembly and the terminal connection while maintaining the pressure in the cluster housing substantially the same as the pressure in the compressor housing.

SUMMARY OF THE INVENTION

In accordance with the present invention, a motor-driven compressor includes a compression mechanism, an electric motor, a compressor housing, a conductive member, a terminal base, an insulating member, a connection terminal, a terminal housing, a wire assembly, first and second holes and first and second seal members. The compression mechanism compresses and discharges refrigerant gas. The electric motor drives the compression mechanism. The compressor housing is made of a metal and accommodates the compression mechanism and the electric motor. A hole is formed through the compressor housing. The conductive member extends from the inside to the outside of the compressor housing through the hole. The terminal base is disposed at the hole of the compressor housing. The insulating member insulates the conductive member from the terminal base. The connection terminal is connected electrically to the conductive member at a terminal connection. The terminal housing made of an insulating material covers the terminal connection and is disposed in the compressor housing. The wire assembly has a core wire connecting electrically between the connecting terminal and the electric motor, an insulator covering the core wire and an insulating tube covering the insulator, wherein both ends of the insulating tube are opened for communicating with the inside and the outside of the terminal housing through a clearance formed between the insulating tube and the insulator. The first hole is formed through the terminal housing and the conductive member is inserted through the first hole. The second hole is formed through the terminal housing and the wire assembly is inserted through the second hole. The first seal member is disposed between the insulating member and the first hole. The second seal member for sealing between the second hole and the insulating tube is set in close contact with the insulating tube Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a motor-driven compressor 10 according to the preferred embodiment of the present invention with reference to FIGS. 1 through 4. The front and the rear of the motor-driven compressor 10 as will be used in the following description are indicated by the double-headed arrow Y1 in FIG. 1.

Figure 1:
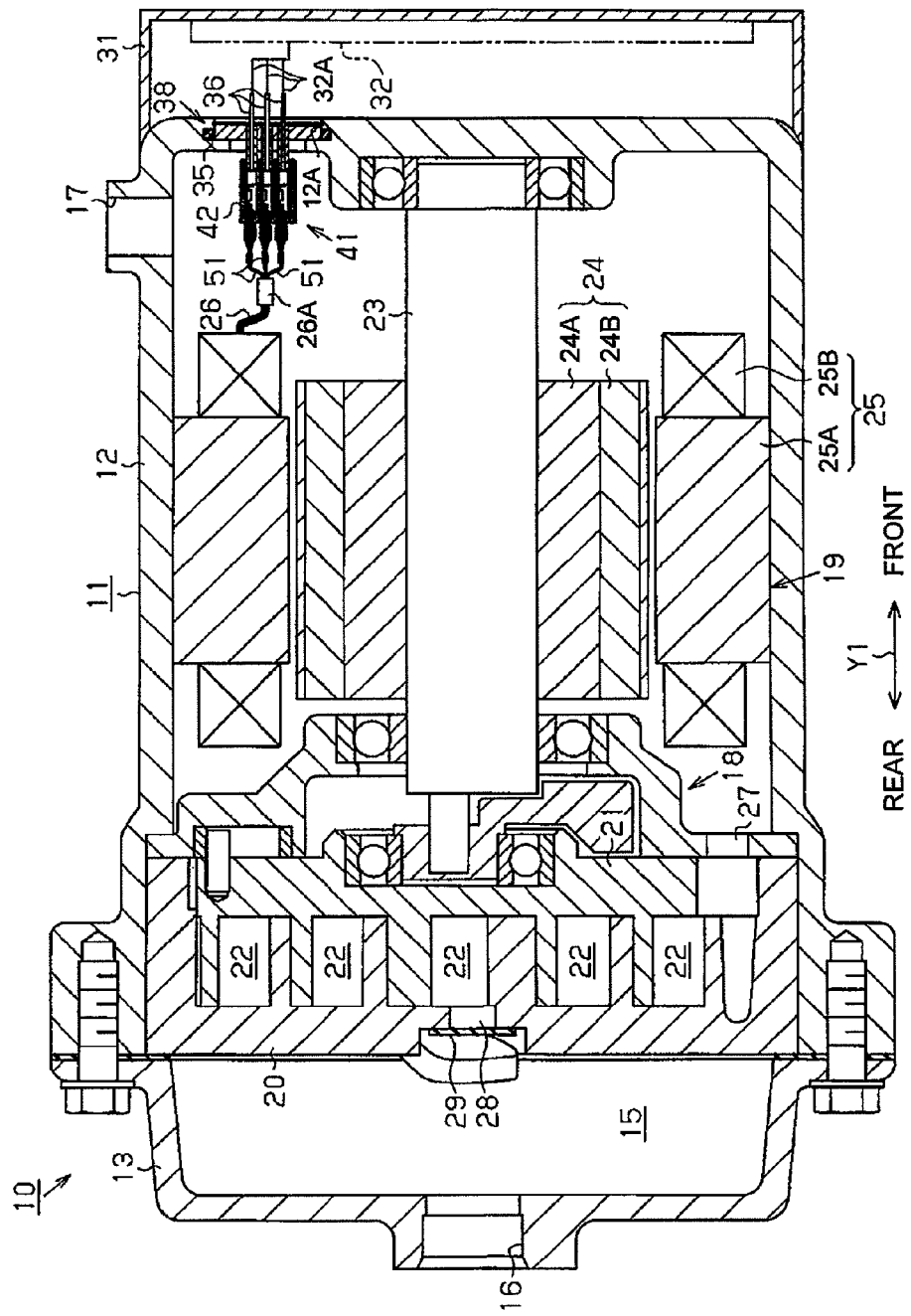
FIG. 1 is a sectional view showing a motor-driven compressor according to a preferred embodiment of the present invention.

Referring to FIG. 1, the motor-driven compressor 10 has a compressor housing 11. The compressor housing 11 made of a metal material includes a first housing (motor housing) 12 and a second housing (discharge chamber housing) 13. A discharge chamber 15 is formed between the first housing 12 and the second housing 13. The second housing 13 has an outlet port 16 formed through the rear end wall thereof and connected to an external refrigerant circuit (not shown). The first housing 12 has an inlet port 17 formed therethrough that is connected to an external refrigerant circuit (not shown). The first housing 12 accommodates therein a compression mechanism 18 for compressing refrigerant gas and an electric motor 19 for driving the compression mechanism 18.

The following will describe the compression mechanism 18 in detail. The compression mechanism 18 includes a fixed scroll 20 mounted fixedly to the first housing 12 and a movable scroll 21 disposed so as to face the fixed scroll 20. Compression chambers 22, whose volume are variable, are formed between the fixed scroll 20 and the movable scroll 21. A rotary shaft 23 is disposed in the first housing 12 and rotatably supported by the first housing 12.

The following will describe the electric motor 19 in detail. The electric motor 19 includes a rotor 24 and a stator 25 in the first housing 12. The rotor 24 is mounted fixedly on the rotary shaft 23 for rotation therewith in the first housing 12. The rotor 24 includes a rotor core 24A mounted fixedly on the rotary shaft 23 and a plurality of permanent magnets 24B mounted to the outer peripheral surface of the rotor core 24A. The stator 25 is formed in a ring shape and includes a stator core 25A and a coil 25B. The stator core 25A is mounted fixedly to the inner peripheral surface of the first housing 12 and the coil 25B is wounded around the teeth (not shown) of the stator core 25A. U-phase, V-phase and W-phase conductive wires 26 extend from the end of the coil 25B and are connected at the ends thereof to an input terminal 26A. Three wire assemblies 51 extend from the input terminal 26A, each corresponding to the U-phase, V-phase or W-phase conductive wires 26.

An inverter cover 31 made of a conductive aluminum alloy and having a box shape whose one end is opened is fixedly mounted to the front end wall of the first housing 12. With the inverter cover 31 thus mounted fixedly to the front end wall of the first housing 12, the front end wall of the first housing 12 serves as the bottom surface of the inverter cover 31. The front end wall of the first housing 12 and the inverter cover 31 form therebetween a space accommodating therein an inverter 32 indicated by chain double-dashed line in FIG. 1 for driving the electric motor 19.

In the above motor-driven compressor 10, when electric power is supplied to the electric motor 19, the rotary shaft 23 is driven to rotate with the rotor 24. This causes the volume of the compression chambers 22 formed in the compression mechanism 18 between the movable scroll 21 and the fixed scroll 20 to be reduced and refrigerant gas is introduced into the first housing 12 from the external refrigerant circuit through the inlet port 17. The refrigerant gas introduced into the first housing 12 is flowed into the compression chamber 22 through a suction passage 27 formed in the compression mechanism 18 and then compressed in the compression chamber 22. The refrigerant gas compressed in the compression chamber 22 is displaced into the discharge chamber 15 through a discharge passage 28 formed through the fixed scroll 20 while pushing open a discharge valve 29 disposed on the fixed scroll 20. The refrigerant gas in the discharge chamber 15 is discharged through the outlet port 16 into the external refrigerant circuit and returns into the motor housing 12 of the motor-driven compressor 10 after circulating through the refrigeration circuit.

Figure 2:
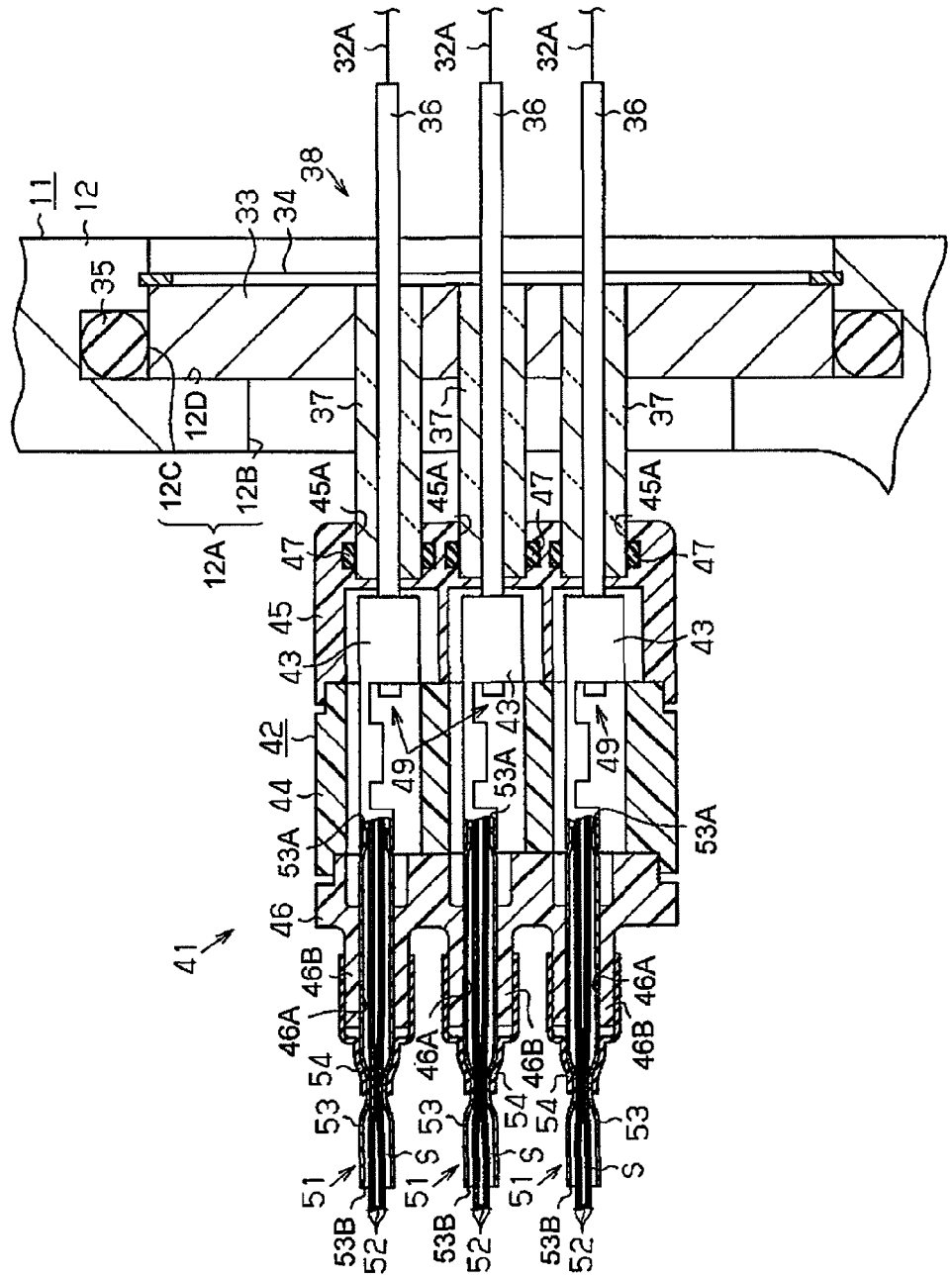
FIG. 2 is an enlarged sectional view showing a terminal connection between a metal terminal and a connecting terminal of the motor-driven compressor of FIG. 1.

Referring to FIG. 2, a hole 12A is formed through the front end wall of the first housing 12 of the compressor housing 11. The hole 12A includes an inner small diameter hole 12B and an outer large diameter hole 12C located forward of the inner small diameter hole 12B. A stepped portion 12D is formed between the inner small diameter hole 12B and the outer large diameter hole 12C. A terminal base 33 which is made of a metal material and forms a part of the compressor housing 11 is fitted to the outer large diameter hole 12C and supported by the stepped portion 12D, so that the hole 12A is closed.

A circlip 34 is provided in the outer large diameter hole 12C for preventing the terminal base 33 from being removed out from the hole 12A. A seal member 35 is provided between the inner peripheral surface of the large diameter hole 12C and the outer peripheral surface of the terminal base 33 to seal therebetween. Three metal terminals 36 and three insulating members 37 are arranged through the terminal base 33. The metal terminal 36 serves as a conductive member for electrically connecting the electric motor 19 to the inverter 32, and the insulating member 37 which is made of a glass material serves to fix the metal terminal 36 to the terminal base 33 while insulating the metal terminal 36 from the terminal base 33. The metal terminal 36, the insulating member 37 and the terminal base 33 form a hermetic terminal 38. The metal terminal 36 is electrically connected to the inverter 32 through a cable 32A.

A cluster block 41 is disposed behind the hermetic terminal 38 in the compressor housing 11. The cluster block 41 has a cluster housing 42 as a terminal housing which is made of an insulating resin and formed into a rectangular shape. The cluster housing 42 includes a base 44, a cover 45 mounted to the front end of the base 44 and a bottom 46 mounted to the opposite rear end of the base 44. The base 44 and the cover 45 are hermetically fixed to each other through an adhesive, and the base 44 and the bottom 46 are also hermetically fixed to each other through an adhesive.

The base 44 accommodates therein three connecting terminals 43. The cover 45 has three first holes 45A formed therethrough corresponding to the respective connecting terminals 43. The metal terminals 36 are inserted through the respective first holes 45A via the insulating members 37 and electrically connected to the front ends of the respective connecting terminals 43. The bottom 46 has three hole forming portions 46B corresponding to the respective connecting terminals 43, each of which has a second hole 46A formed therein. The wire assemblies 51 are inserted through the respective second holes 46A and connected electrically to the respective connecting terminals 43.

Thus, the wire assembly 51 and the metal terminal 36 are inserted through the cluster housing 42 and electrically connected to each other through the connecting terminal 43 in the cluster housing 42, so that the electric motor 19 and the inverter 32 are electrically connected to each other. The cluster housing 42 covers a plurality of the terminal connections 49 connecting the metal terminal 36 to the connecting terminal 43. An O-ring 47 serving as a first seal member is disposed between the insulating member 37 and the first hole 45A for sealing therebetween and insulating a part of the metal terminal 36 exposed from the insulating member 37 in the cluster housing 42 from the compressor housing 11.

Figure 3:
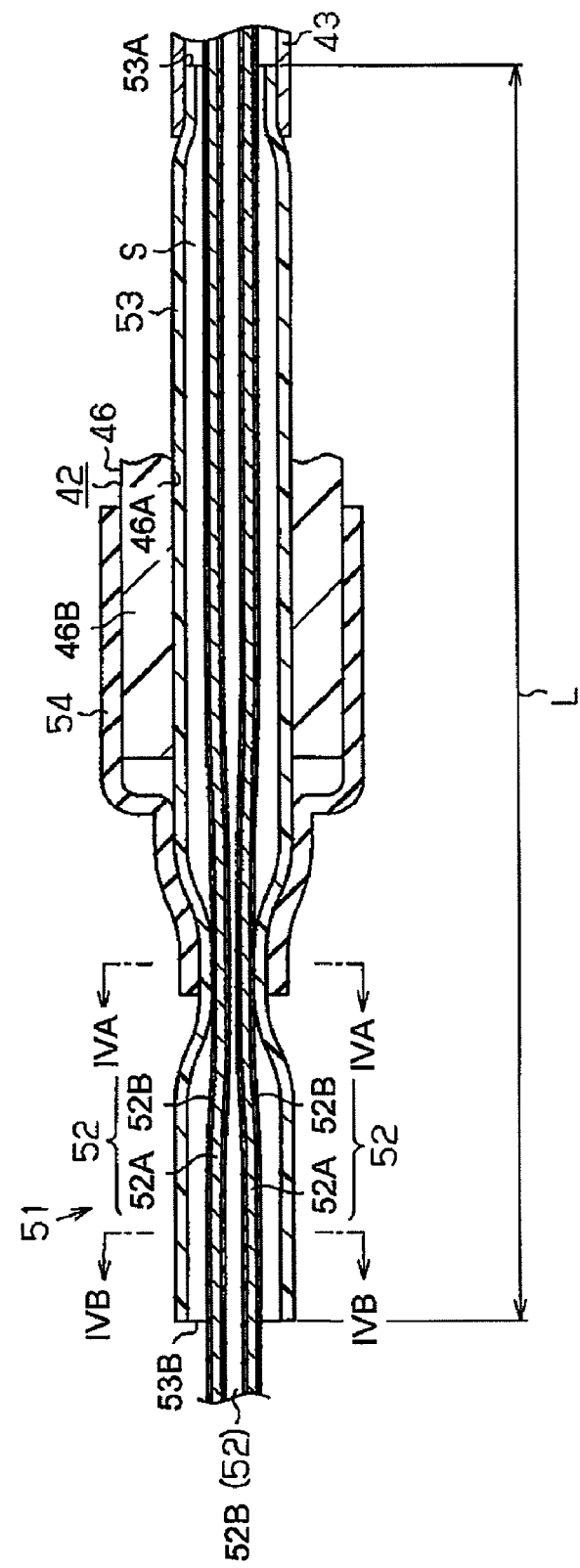
FIG. 3 is an enlarged sectional view showing wire assembly of the terminal connection of FIG. 2.
Figure 4A:
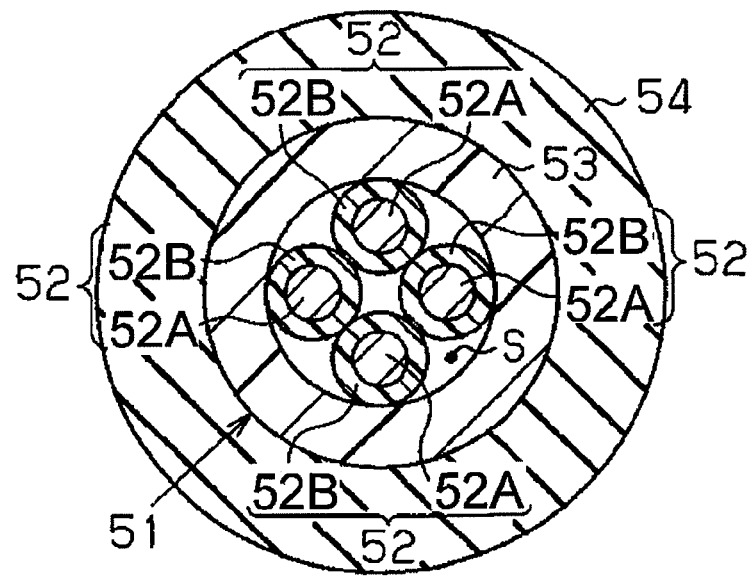
FIG. 4A is a cross-sectional view taken along the line IVA-IVA of FIG. 3.
Figure 4B:
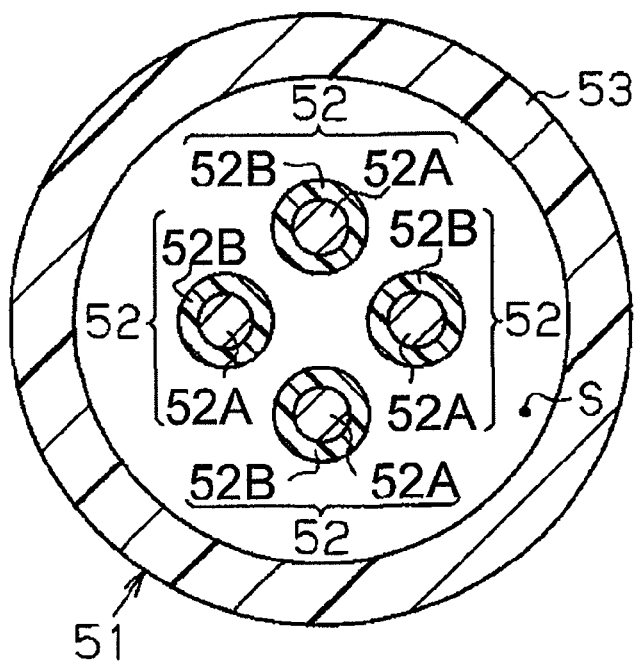
FIG. 4B is a cross-sectional view taken along the line IVB-IVB of FIG. 3.

The following will describe the wire assemblies 51 more in detail. Referring to FIGS. 3, 4A and 4B, the wire assembly 51 has four conductors 52 each including a core wire 52A covered with an insulator 52B and electrically connecting between the connecting terminal 43 and the electric motor 19. An insulating tube 53 covering the four conductors 52 is provided extending through and out of the cluster housing 42, or through the second hole 46A. The connecting terminal 43 is electrically connected to the wire assembly 51 such that the core wire 52A is exposed from the insulator 52B, so that the connecting terminal 43 is electrically connected to the core wire 52A. In connections between the connecting terminal 43 and the wire assembly 51, the core wire 52A is exposed from the insulator 52B and connected to the connecting terminal 43.

The insulating tube 53 is made of a fluorocarbon resin and has excellent resistance against refrigerant and oil. The insulating tube 53 is connected to the connecting terminal 43 by pressing the rear end of the connecting terminal 43 against the outer peripheral surface of the front end 53A of the insulating tube 53 so as to be supported by the connecting terminal 43 and opened to the inside of the cluster housing 42. The rear end 53B of the insulating tube 53 is opened to the compressor housing 11 without being pressed against the conductors 52. A clearance S is formed between the insulator 52B and the insulating tube 53 so as to be opened at the opposite front and rear ends 53A, 53B of the insulating tube 53. Thus, the insulating tube 53 and the compressor housing 11 communicate with each other through the opening at the rear end 53B of the insulating tube 53, and the compressor housing 11 and the cluster housing 42 communicate with each other through the clearance S and an opening at the front end 53A of the insulating tube 53. The rear end of the conductor 52 located adjacent to the electric motor 19 is opened to the compressor housing 11 through the opening at the rear end 53B of the insulating tube 53. In other words, both ends 53A, 53B of the insulating tube 53 are opened for communicating with the inside and the outside of the cluster housing 42 through the clearance S.

A part of the wire assembly 51 extending between the cluster block 41 and the input terminal 26A is covered with a heat-shrinkable tube 54. The front end of the heat-shrinkable tube 54 is radially expanded and set in close contact with the outer peripheral surface of the hole forming portion 46B of the bottom 46 of the cluster housing 42, and the rear end of the heat-shrinkable tube 54 is set in close contact with the outer peripheral surface of the insulating tube 53. Thus, the heat-shrinkable tube 54 prevents liquid refrigerant from entering into the cluster housing 42 through a clearance between the insulating tube 53 and the second hole 46A. In other words, the heat-shrinkable tube 54 seals between the interiors of the cluster housing 42 and the compressor housing 11. Therefore, the heat-shrinkable tube 54 serves as a second seal member for preventing liquid refrigerant from entering into the cluster housing 42 through a clearance between the second hole 46A and the insulating tube 53.

Referring to FIG. 4A, the rear end of the heat-shrinkable tube 54 is shown shrunk by heat. As will be appreciated from comparison with FIG. 4B showing the cross-section of the wire assembly 51 where no heat-shrinkable tube 54 is provided, the cross-sectional area of the clearance S is smaller than the other part of the cross-sectional area of the clearance S where the heat-shrinkable tube 54 is not provided as shown in FIG. 3. Thus, the heat-shrinkable tube 54 serves as a clearance adjustor for adjusting the cross-sectional area of the clearance S.

In the above-described motor-driven compressor 10, when the operation of the motor-driven compressor 10 is stopped, refrigerant gas in the compressor housing 11 is cooled to condense the refrigerant gas into liquid refrigerant, and the liquid refrigerant may be accumulated and remain in the compressor housing 11. In this time, the O-ring 47 and the insulating member 37 prevent the compressor housing 11 from conducting electrically with the metal terminal 36 through the liquid refrigerant, insulate between the compressor housing 11 and the metal terminal 36 and seal between the cluster housing 42 and the compressor housing 11. The heat-shrinkable tube 54 and the O-ring 47 prevent the liquid refrigerant from entering into the cluster housing 42 through other than the clearance S of the insulating tube 53. Thus, the cluster housing 42 and the compressor housing 11 are not electrically conducted through the clearance S of the insulating tube 53 by the liquid refrigerant flowing from the cluster housing 42 to the compressor housing 11. Therefore, the metal terminal 36 in the cluster housing 42, the core wire 52A of the wire assembly 51 and the terminal connection 49 are insulated from the compressor housing 11.

Disposing the O-ring 47 and the heat-shrinkable tube 54 in the cluster housing 42 for sealing the cluster housing 42, the cluster housing 42 is made fluid-tight. However, the opposite front and rear ends 53A, 53B of the insulating tube 53 are opened, and, therefore, the compressor housing 11 is in fluid communication with the cluster housing 42 through the clearance S of the insulating tube 53, so that the pressure in the cluster housing 42 becomes substantially the same as the pressure in the compressor housing 11. The metal terminal 36, the core wire 52A of the wire assembly 51 and the terminal connection 49 are conducted with the compressor housing 11 through the liquid refrigerant remaining in the clearance S of the insulating tube 53, so that the conducting distance through the liquid refrigerant becomes longer by a length L of the insulating tube 53. Thus, the shortest insulating distances between the compressor housing 11 and the respective metal terminal 36 in the cluster housing 42, the core wire 52A of the wire assembly 51 and the terminal connection 49 are extended. In other words, the clearance S is formed on the path of the shortest insulating distance between the compressor housing 11 and any one of the conductive member 36 in the terminal housing 42, the core wire 52A and the terminal connection 49, and the inside of the terminal housing does not communicate with the outside of the terminal housing 42 except for through the clearance S.

According to the above preferred embodiment, the following advantageous effects are obtained.

(1) Disposing the O-ring 47 between the first hole 45A and the insulating member 37 for sealing therebetween thereby to prevent liquid refrigerant from entering into the cluster housing 42, the metal terminal 36 in the cluster housing 42 may be insulated from the compressor housing 11. Furthermore, the provision of the O-ring 47 and the heat-shrinkable tube 54 for sealing between the cluster housing 42 and the compressor housing 11 prevents electrical current transmitted to the terminal connection 49 is prevented from being leaked through the liquid refrigerant to the cluster housing 42 and the compressor housing 11 through other than the clearance S of the insulating tube 53. Thus, the metal terminal 36 in the cluster housing 42, the core wire 52A of the wire assembly 51 and the terminal connection 49 may be insulated from the compressor housing 11. The front end 53A of the insulating tube 53 is opened to the cluster housing 42 and the rear end 53B of the insulating tube 53 is opened to the compressor housing 11. The insulating tube 53 has the front end 53A thereof opened to the cluster housing 42 and the rear end 53B thereof opened to the compressor housing 11, so that the cluster housing 42 communicates with the compressor housing 11 through the clearance S formed in the insulating tube 53, and, therefore, the pressure in the cluster housing 42 is substantially the same as that of the compressor housing 11. This prevents the cluster housing 42 from being damaged due to the pressure difference between the cluster housing 42 and the compressor housing 11 that the cluster housing 42 cannot resist. The shortest insulating distances between the compressor housing 11 and the respective metal terminal 36 in the cluster housing 42, the core wire 52A of the wire assembly 51 and the terminal connection 49 may be extended by the length L of the insulating tube 53. Thus, insulating resistances between the compressor housing 11 and the respective metal terminal 36 in the cluster housing 42, the core wire 52A of the wire assembly 51 and the terminal connection 49 may be improved.

(2) The provision of the heat-shrinkable tube 54 sealing between the cluster housing 42, and the outer peripheral surfaces of the hole forming portion 46B and the insulating tube 53 prevents liquid refrigerant from entering into the cluster housing 42 through a clearance between the second hole 46A and the insulating tube 53. Shrinking the heat-shrinkable tube 54 by heat reduces the diameter of the insulating tube 53 and hence the cross-sectional area of the clearance S. Thus, the path of the current flowing through the liquid refrigerant is narrowed. Therefore, if the length L of the insulating tube 53 is shortened, substantially the same insulating resistance is accomplished as in a case where the length L of the insulating tube 53 is not shortened and the cross-sectional area of the clearance S is not reduced.

(3) The front end 53A of the insulating tube 53 is connected to the connecting terminal 43 by pressing the rear end of the connecting terminal 43 against the outer peripheral surface of the front end 53A of the insulating tube 53. Thus, the cross-sectional area of the clearance S on the side adjacent to the front end 53A of the insulating tube 53 is reduced thereby to improve insulating resistances between the compressor housing 11 and the respective metal terminal 36 in the cluster housing 42, the core wire 52A of the wire assembly 51 and the terminal connection 49.

The above preferred embodiment may be modified into various alternative embodiments as exemplified below.

Figure 5:
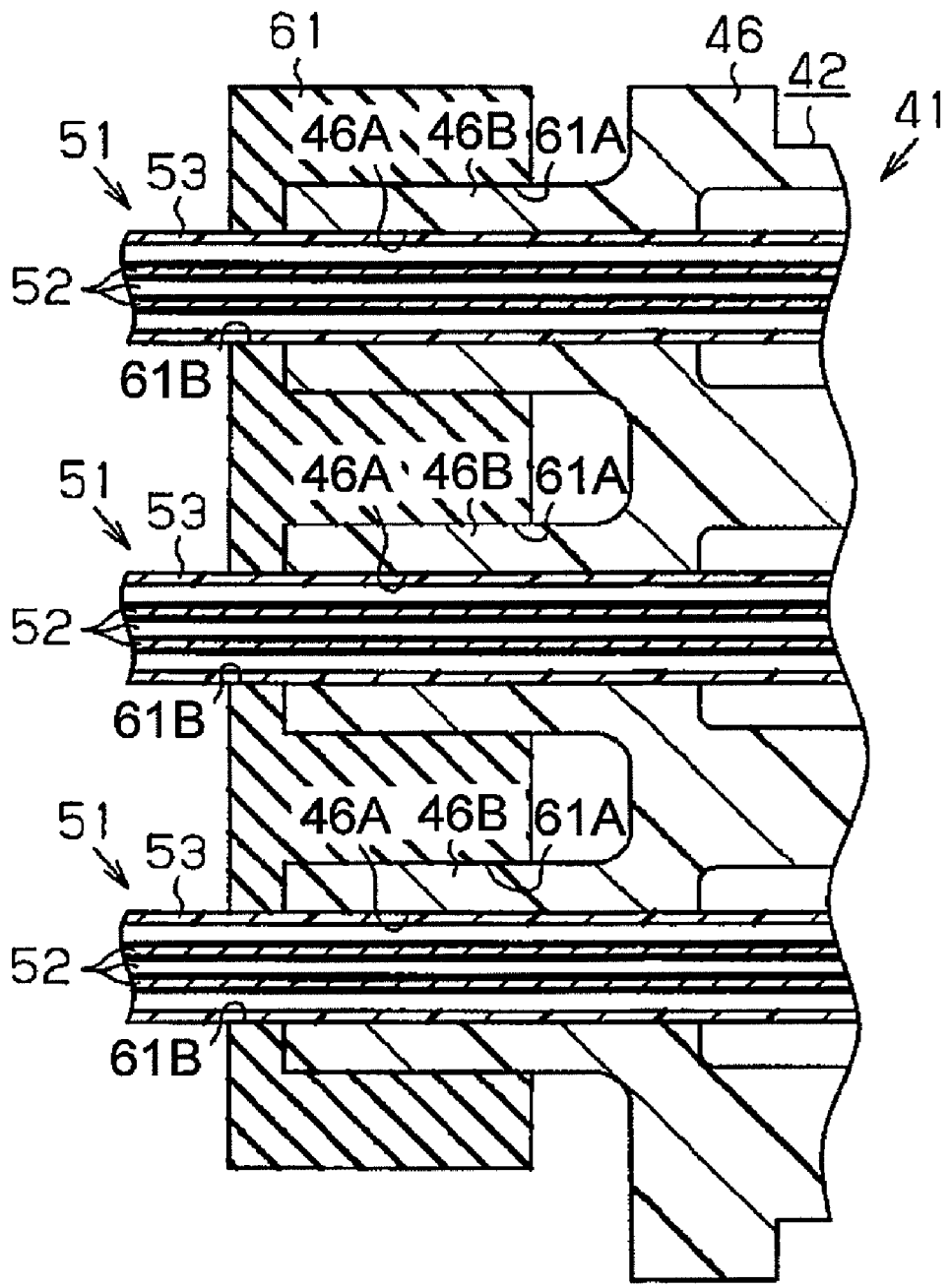
FIG. 5 is an enlarged sectional view showing a part of a cluster block according to another embodiment of the present invention.

According to the above preferred embodiment, the heat-shrinkable tube 54 is disposed in the cluster housing 42 as the second seal member. Alternatively, a grommet 61 may be used in the cluster housing 42 as the second seal member for sealing between the insulating tubes 53 and the second holes 46A, as shown in FIG. 5. The grommet 61 has three concave portions 61A formed so as to be in closed contact with the respective outer peripheral surfaces of the hole forming portions 46B and three holes 61B which are formed to communicate with the concave portion 61A and through which the respective wire assemblies 51 are inserted. Mounting the grommet 61 to the bottom 46 of the cluster housing 42 with the hole forming portion 46B engaged in close contact with the concave portion 61A of the grommet 61, the grommet 61 seals between the wire assemblies 51 and the second holes 46A. Compared to a case wherein seal members are disposed between insulating tubes 53 and the second holes 46A, respectively, sealing between the insulating tube 53 and the second hole 46A may be accomplished by a single seal member, and, therefore, the number of the seal members for use may be reduced.

The grommet 61 may be formed such that each hole 61B thereof has a diameter that is smaller than that of the insulating tube 53. By so doing, the cross-sectional area of the clearance S in the insulating tube 53 may be reduced. Therefore, if the length L of the insulating tube 53 is shortened, substantially the same insulating resistance is accomplished as in a case where the cross-sectional area of the clearance S is not reduced and the length L of the insulating tube 53 is not shortened.

Figure 6:
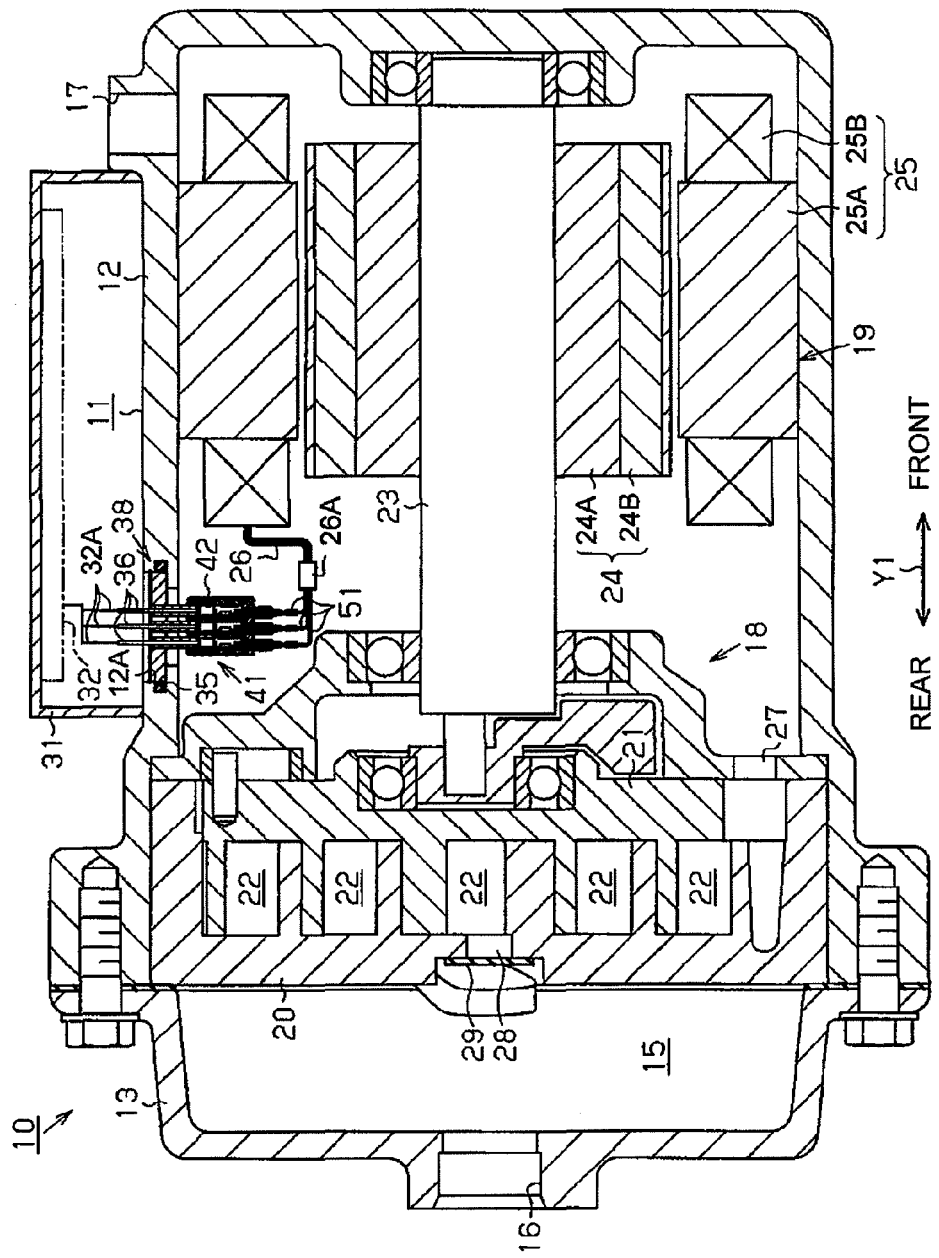
FIG. 6 is a sectional view showing a motor-driven compressor according to yet another embodiment of the present invention.

According to the above preferred embodiment, the hermetic terminal 38 is disposed through the hole 12A formed through the front end wall of the first housing 12, and the cluster block 41 is disposed in the front of the electric motor 19 in the compressor housing 11. Alternatively, the hermetic terminal 38 may be disposed through a hole 12A formed through the peripheral wall of the first housing 12 at a position behind the electric motor 19, and the cluster block 41 may be disposed below the hermetic terminal 38 and behind the electric motor 19 in the compressor housing 11 as shown in FIG. 6.

A seal member may be disposed between the insulating tube 53 and the hole forming portion 46B for sealing therebetween, and a part of the insulating tube 53 may be bound by a ribbon or a rubber band (clearance adjusting member) for adjusting the cross-sectional area of the clearance S in the insulating tube 53.

According to the above preferred embodiment, the O-ring 47 is used for sealing between the insulating member 37 and the first hole 45A. Alternatively, sealing between the insulating members 37 and the first holes 45A may be accomplished by a single grommet.

According to the above preferred embodiment, the cluster housing 42 is composed of the base 44, the cover 45 and the bottom 46. Alternatively, the cluster housing 42 may be composed of one member or two members, or more than three members.

According to the above preferred embodiment, the four conductors 52 forming each wire assembly 51 are disposed in the insulating tube 53. According to the present invention, the number of the conductors 52 is not limited to four, but any number of the conductors 52 may be used.

According to the above preferred embodiment, three metal terminals 36 and wire assemblies 51 are used, but the number of such metal terminals 36 and wire assemblies 51 is not limited to three.

According to the above preferred embodiment, each wire assembly 51 is covered with the heat-shrinkable tube 54. All insulating tubes 53 may be bundled together and covered with a heat-shrinkable tube and shrunk together. Instead of being covered with the heat-shrinkable tubes, but the insulating tubes 53 may be bundled together by any bundling member such as a ribbon.

According to the above preferred embodiment, the compression mechanism 18 includes the fixed scroll 20 and the movable scroll 21, and the compression mechanism 18 is not limited to a scroll type, but it may be of a piston type or a vane type.

What is claimed is:

1. A motor-driven compressor comprising:
   a compression mechanism compressing and discharging refrigerant gas;
   an electric motor driving the compression mechanism;
   a compressor housing made of a metal, the compressor housing accommodating the compression mechanism and the electric motor, the compressor housing through which a hole is formed;
   a conductive member extending from the inside to the outside of the compressor housing through the hole;
   a terminal base disposed at the hole of the compressor housing;
   an insulating member insulating the conductive member from the terminal base;
   a connection terminal connected electrically to the conductive member at a terminal connection;
   a terminal housing made of an insulating material, covering the terminal connection and disposed in the compressor housing;
   a wire assembly having a core wire connecting electrically between the connecting terminal and the electric motor, an insulator covering the core wire and an insulating tube covering the insulator, wherein both ends of the insulating tube are opened for communicating with the inside and the outside of the terminal housing through a clearance being formed between the insulating tube and the insulator;
   a first hole is formed through the terminal housing and the conductive member is inserted through the first hole;
   a second hole is formed through the terminal housing and the wire assembly is inserted through the second hole;
   a first seal member disposed between the insulating member and the first hole; and
   a second seal member set in close contact with the terminal housing and the insulating tube.

2. The motor-driven compressor according to claim 1, wherein the terminal housing has a hole forming portion in which the second hole is formed, the second seal member is a heat-shrinkable tube covering the outer peripheral surface of the hole forming portion and the outer peripheral surface of the insulating tube in sealed contact with the respective surfaces, and
   wherein shrinking the heat-shrinkable tube by heat reduces the diameter of the insulating tube.

3. The motor-driven compressor according to claim 1, wherein the insulating tube is made of an insulating fluorocarbon resin.

4. The motor-driven compressor according to claim 1, wherein the terminal housing is a cluster housing covering a plurality of the terminal connections.

5. The motor-driven compressor according to claim 4, wherein the motor-driven compressor has a plurality of the wire assemblies extending from the electric motor and a plurality of the second holes for inserting the wire assemblies through the second holes respectively, and the second seal member is a grommet which seals between a plurality of the insulating tubes of the wire assemblies and the second holes.

6. The motor-driven compressor according to claim 1, wherein the clearance is formed on the path of shortest insulating distance between the compressor housing and any one of the conductive member in the terminal housing, the core wire and the terminal connection.

7. The motor-driven compressor according to claim 1, wherein the inside of the terminal housing does not communicate with the outside of the terminal housing except for through the clearance.

8. The motor-driven compressor according to claim 1, wherein the compressor housing includes a first housing, and the hole is formed through the front end wall of the first housing or the peripheral wall of the first housing.

* * * * *